Jan. 23, 1934.  C. M. BAILEY  1,944,486
VALVE
Filed Jan. 19, 1931   2 Sheets-Sheet 1

INVENTOR:
CHARLES M. BAILEY.
BY
ATTORNEY.

Jan. 23, 1934. C. M. BAILEY 1,944,486
VALVE
Filed Jan. 19, 1931 2 Sheets-Sheet 2

INVENTOR:
CHARLES M. BAILEY.
BY
ATTORNEY.

Patented Jan. 23, 1934

1,944,486

UNITED STATES PATENT OFFICE 1,944,486

VALVE

Charles M. Bailey, Berkeley, Calif.

Application January 19, 1931. Serial No. 509,732

3 Claims. (Cl. 137—153)

This invention relates to improvements in valves and more particularly to pressure regulated automatic valves.

Among the objects of the invention is to accomplish the maximum opening of the valve with the minimum of movement.

Another object is to provide a valve of large capacity especially adapted to regulation by automatic pressure or thermostatic control.

A further object is to provide a sensitive valve particularly adaptable to handling gases and vapors and especially gas fuel for steam generators.

Other objects and advantages will appear as the description progresses.

In this specification and the accompanying drawings the invention is disclosed in its preferred form for a particular purpose. But it is to be understood that it is not limited to this form, because it may be embodied in other forms. It is also to be understood that in and by the claims following the description it is intended to cover the invention in whatsoever form it may be embodied.

Figure 2:
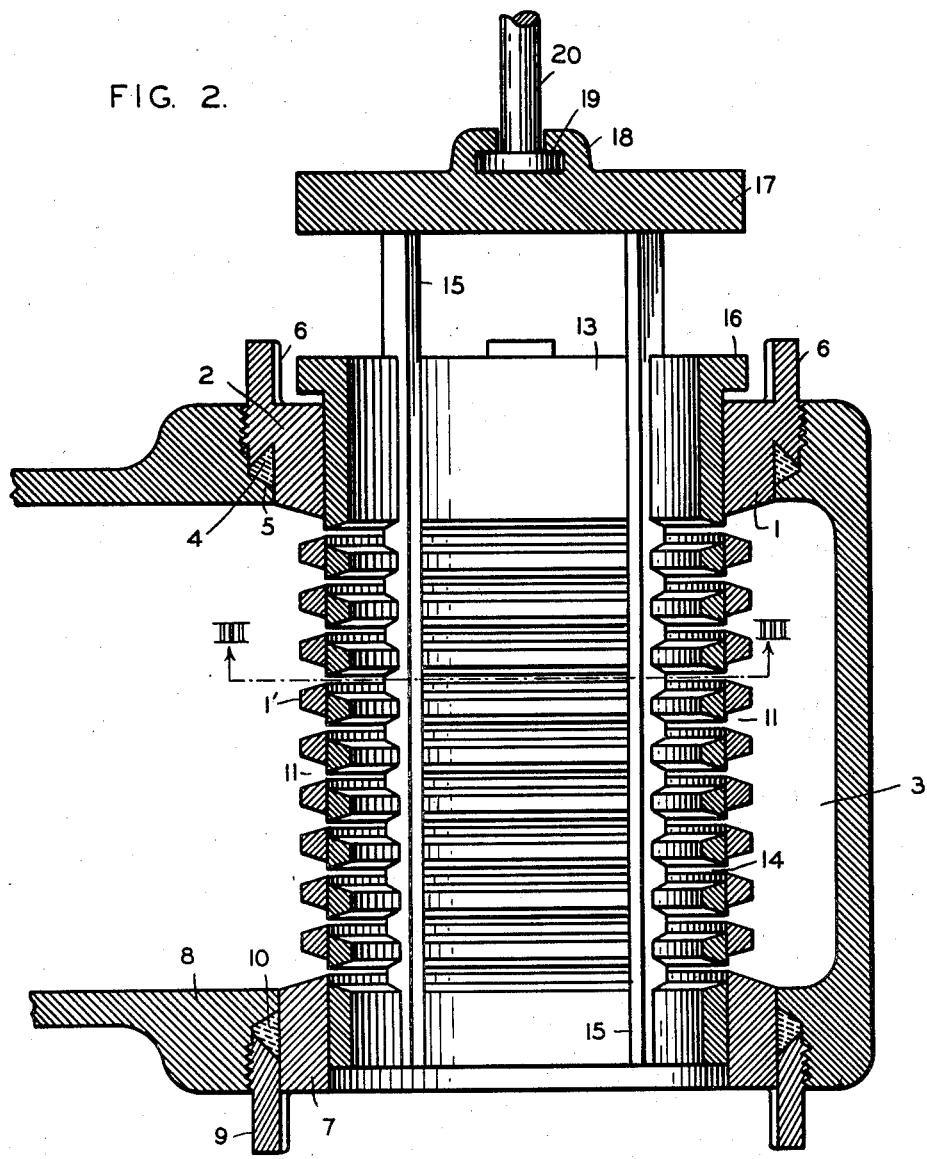
Fig. 2 is an enlarged detail in vertical section of the cage valve of the same.

In detail the construction illustrated in the drawings, referring to Fig. 2, comprises the annular outer sleeve 1, having the overhanging flange 2 externally threaded to engage the threaded opening in the top of the internal chamber 3.

This flange is under-cut to compress the packing 4 resting upon the inclined shoulder 5. The top of the sleeve 1 is castellated to form the lugs 6—6 to engage a suitable spanner for turning the sleeve.

The lower skirt 7 of the sleeve 1 extends through the floor 8 of the chamber. The castellated gland 9 is screwed into the floor 8 to compress the packing 10. The outer sleeve is thus sealed pressure-tight within the chamber 3 by the packings 4—10.

Figure 3:
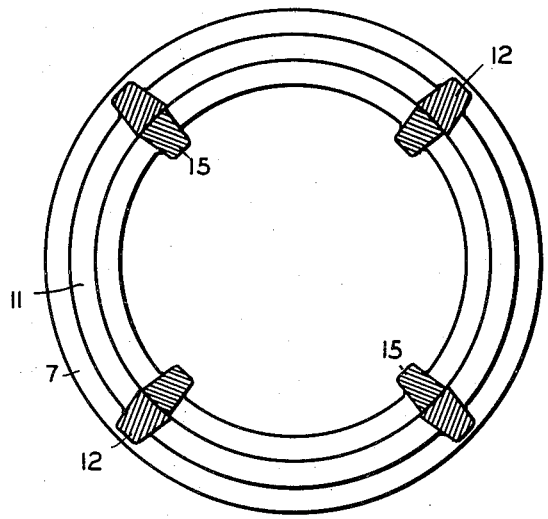
Fig. 3 is a horizontal section on the line III—III of Fig. 2 of the telescoping sleeves of the valve.

The outer sleeve is divided into a series of annular rings 1' with the annular ports 11—11, between the vertical shrouds 12—12 which hold the rings in fixed relation, see Fig. 3. These ports preferably taper inwardly to give beveled cut off edges to the mouths of the ports.

The inner sleeve 13 has the annular ports 14—14 registering with the ports 11—11. The integrity of the inner sleeve is maintained by the shrouds 15—15, and is a close sliding fit within the outer sleeve 1. The flange 16 overhangs the top of the outer sleeve and acts as a stop when the ports 11—14 are closed.

The shrouds 15—15 extend upwardly and are joined to the deflecting disc head 17. The boss 18 is formed on this head and is milled with an under-cut to freely engage the head 19 of the stem 20.

Figure 1:
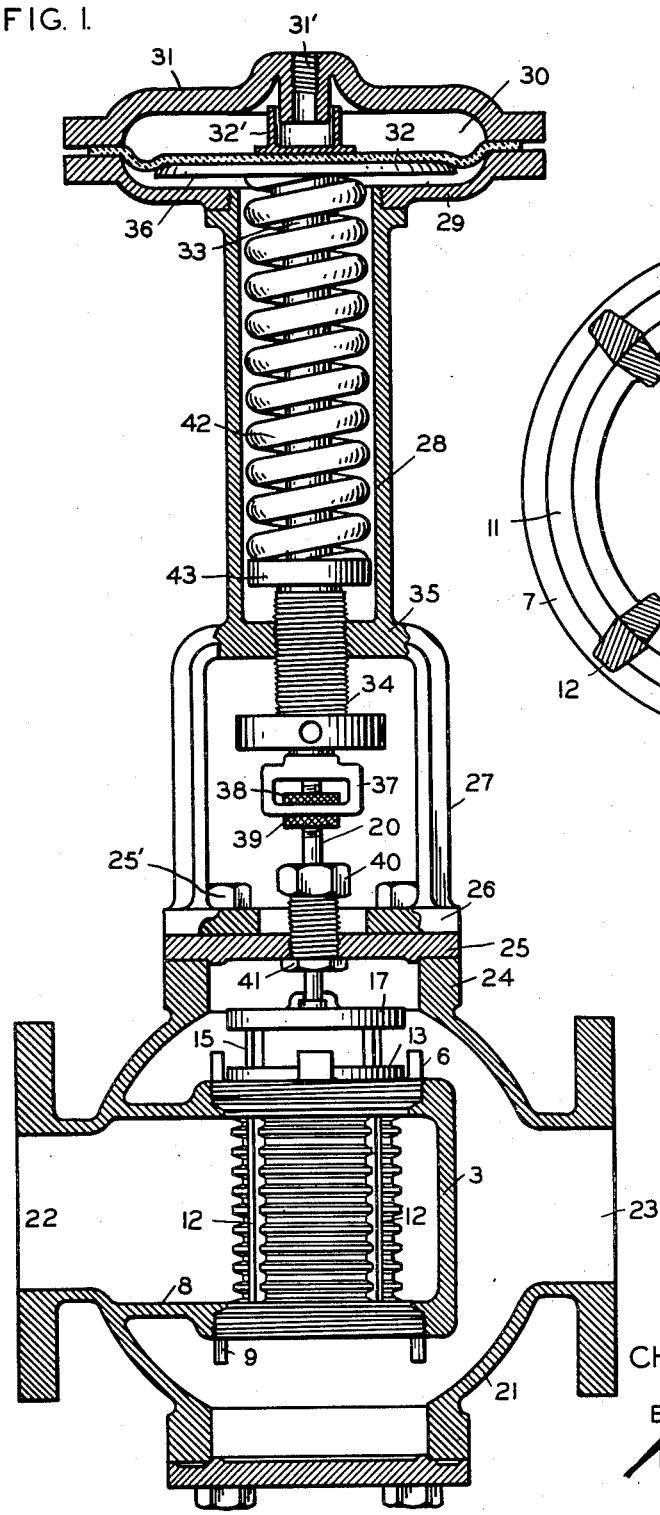
Fig. 1 is a vertical section of a pressure regulated valve constructed in accordance with this invention.

The walls of the chamber 3 are integral with the enclosing globular fitting 21 which has the flanged inlet and outlet openings 22—23 respectively, see Fig. 1. The nature of the fitting may be varied to meet special conditions. The neck 24 is topped by the cover 25, held by cap screws 25', extending through the flange 26 of the yoke 27, and engaging the neck 24. The continuation of this yoke forms the tubular extension 28.

This extension is screwed into the lower flanged plate 29 of the diaphragm chamber 30. The upper plate 31 is flanged and is screwed to the lower plate to complete the chamber 30 and confine the margins of the flexible diaphragm 32 between the upper and lower plates.

The upper plate 31 is provided with the hollow hub 31' telescoping within the annular cup 32' resting upon the diaphragm to protect it from injury by the hub 31' or the under surface of the plate 31. The lower end of the shaft 33 is guided in the adjustable nut 34 screwed into the bottom 35 of the tube 28.

The disc 36 is attached to the head of the shaft 33 and moves therewith. The lower end of the shaft 33 has the loop 37 fixed thereon to receive the end of the valve stem 20, the end of which telescopes within the shaft 33. This stem is supported by the running nut 38 within the loop, in cooperation with the lock nut 39. This stem is vertically alined by the guide 40, screwed into the cover 25 and having the internal packing gland 41.

Thus assembled the inner sleeve 13 rises and falls with the rise and fall of the diaphragm 32. The spring 42 is confined within the tubular extension 28 and expands between the disc 36 and the collar 43 encircling the shaft 33 and resting upon the nut 34. The tension of the spring is regulated by turning this nut 34, with respect to the counterbalancing fluid pressure on top of the diaphragm 32.

The present design of the invention is particularly adapted to fuel control valves for steam generating boilers using gas fuel. The fuel enters at 22, into the chamber 3, surrounding the sleeve 7, passes through the valves 11—14 and escapes through both ends of the sleeve 13, into the fitting 21, and from the outlet 23.

The steam pressure is piped to the pressure chamber 30 through the threaded spud 31', above the diaphragm. As the pressure increases it forces the diaphragm 32 downward against the tension of the spring 42, closing the ports 11—14, reducing the amount of fuel entering at 22 and flowing through these ports and out at 23. Contrariwise a drop in pressure in the chamber 30, opens the ports 11—14, admitting more fuel to the furnace beneath the boiler, not shown, to increase the generation of pressure.

By a simple adjustment of the valve stem 20, by means of the nuts 38—39, an exact equilibrium can be automatically maintained between the amount of fuel and the desired pressure. Obviously a conventional thermostatic control unit could be substituted for the pressure means shown, for operating the sleeve 13, without departing from the spirit of this invention.

Having thus described this invention, what is claimed and desired to secure by Letters Patent is:

1. A valve including an enclosing fitting having inlet and outlet openings and an internal chamber communicating with said inlet; an outer sleeve comprising a series of superimposed interposed rings held in tubular arrangement by shrouds, one end of said sleeve being threaded in the wall of said chamber and compressing an interposed gland packing; an annular gland threaded in the opposite wall of said chamber and compressing an interposed packing against the opposite end of said sleeve; an inner sleeve of similar construction to said outer sleeve and slidable therein and open at both ends to the outlet of said fitting; and an operating stem engaging said inner sleeve.

2. A valve including an enclosing fitting having inlet and outlet openings and an internal chamber communicating with said inlet; an outer sleeve having annular horizontal ports, and an overhanging flange threaded into the wall of said chamber; a packing interposed between said flange and wall; a packing interposed between the opposite end of said sleeve and the adjacent wall of said chamber and means for compressing said packing; an inner sleeve of similar construction to said outer sleeve and slidable therein and open to said outlet opening and having a stop flange overhanging an end of said outer sleeve; and an operating stem engaging said inner sleeve and extending through the wall of said fitting.

3. A valve including an enclosing fitting having inlet and outlet openings and an internal chamber communicating with said inlet; an outer sleeve having ports therein, one end of said sleeve being threaded in the wall of said chamber and compressing an interposed gland packing; an annular gland threaded in the opposite wall of said chamber and compressing an interposed packing against the opposite end of said sleeve; an inner sleeve of similar construction to said outer sleeve and open to said outlet opening; and an operating stem engaging said inner sleeve.

CHARLES M. BAILEY.